Oct. 15, 1963   A. B. SCHAFFER ETAL   3,106,820
AFTERBURNER CONTROL METHOD AND APPARATUS
Filed April 15, 1959   4 Sheets-Sheet 2

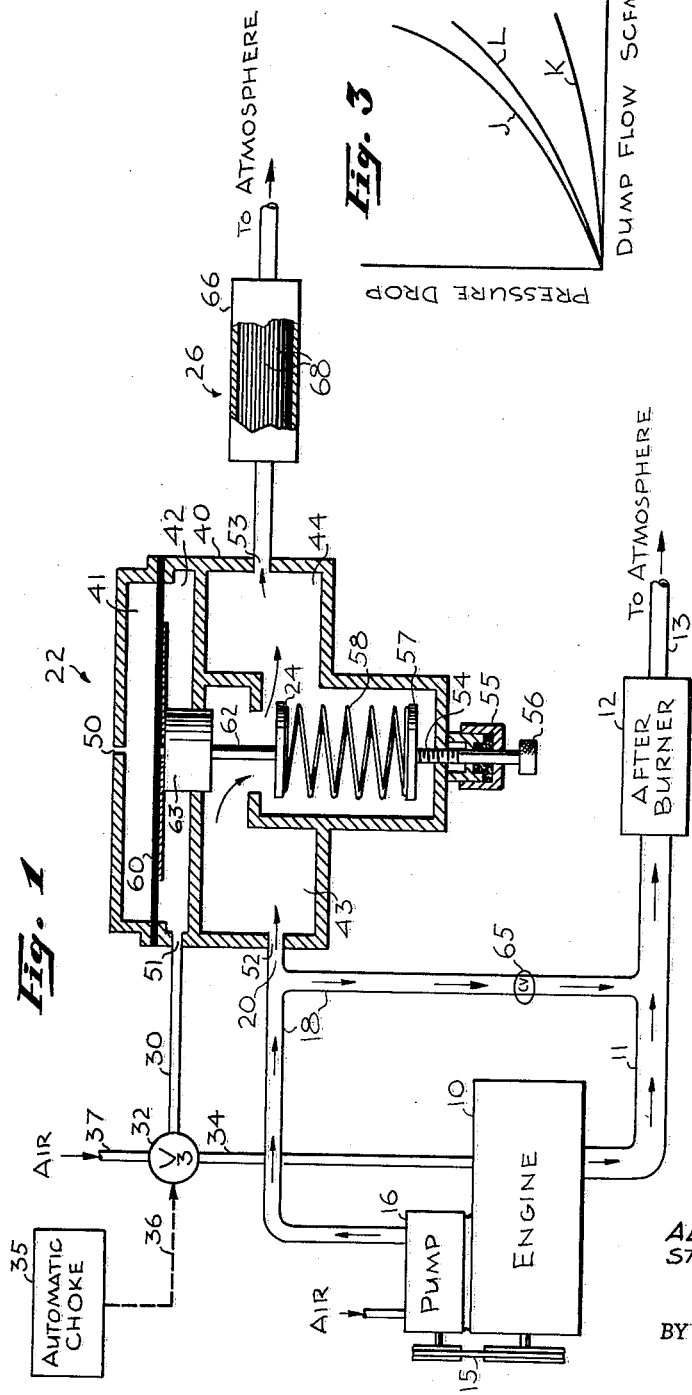

ALLAN B. SCHAFFER
STUART L. RIDGWAY
INVENTORS

BY David P. Ogden
Morris Spector
ATTORNEYS

Oct. 15, 1963  A. B. SCHAFFER ETAL  3,106,820
AFTERBURNER CONTROL METHOD AND APPARATUS
Filed April 15, 1959  4 Sheets-Sheet 3
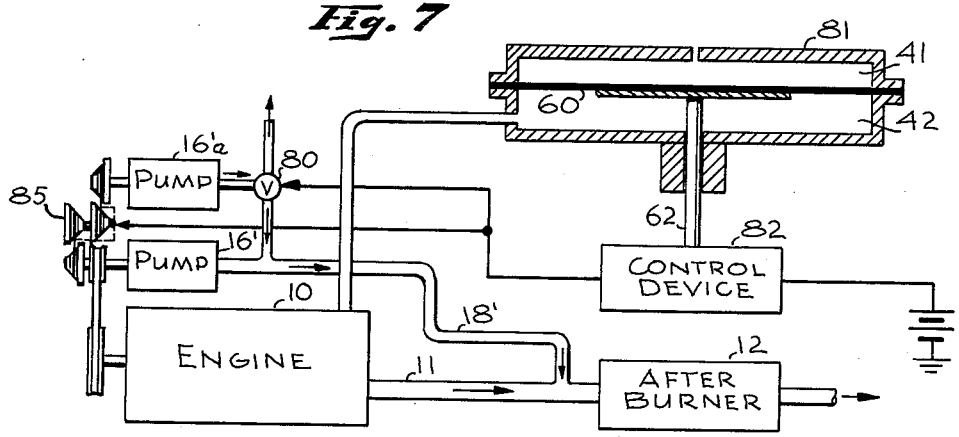
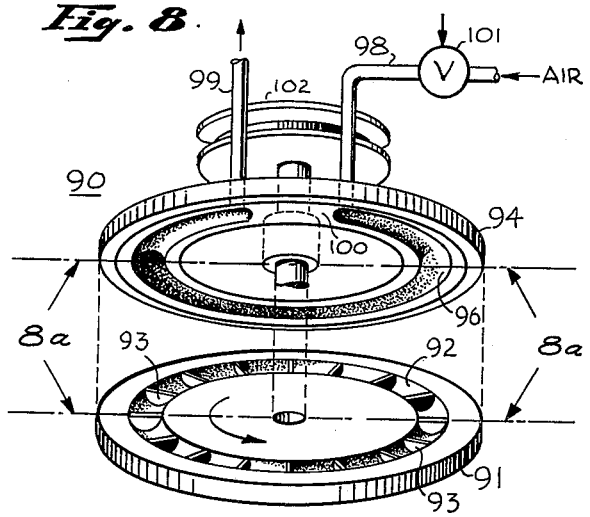
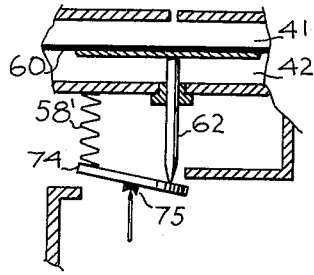
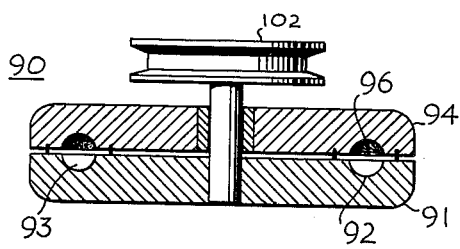
ALLAN B. SCHAFFER
STUART L. RIDGWAY
INVENTORS
BY
ATTORNEYS

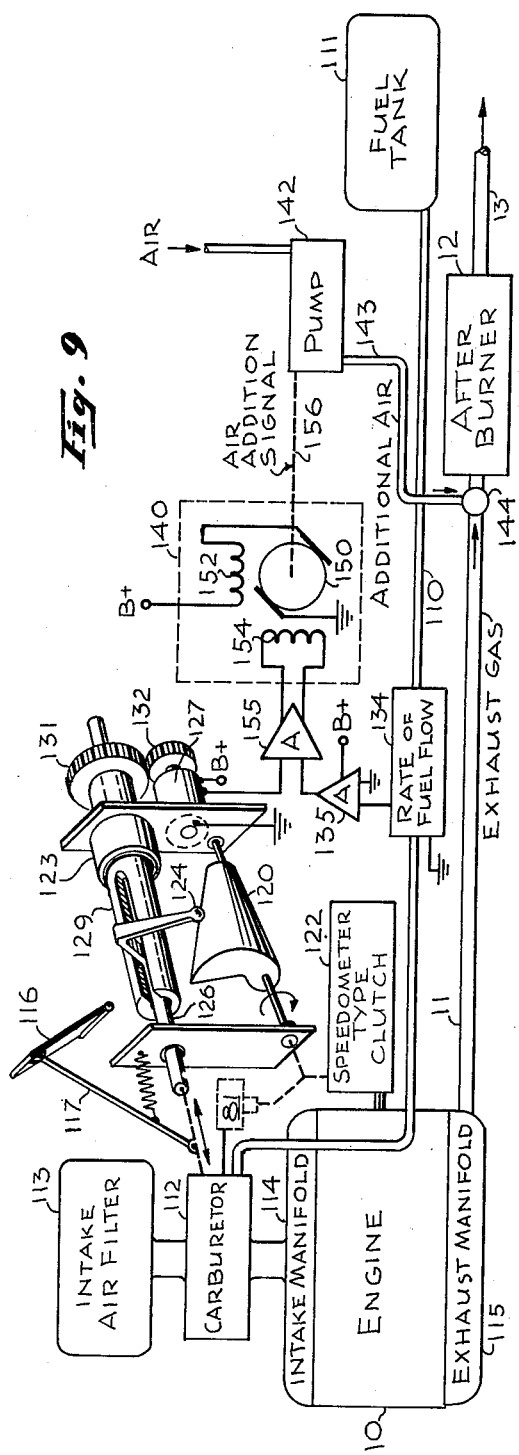

United States Patent Office 3,106,820
Patented Oct. 15, 1963

3,106,820
AFTERBURNER CONTROL METHOD AND APPARATUS
Allan B. Schaffer, Palos Verdes Estates, and Stuart L. Ridgway, Redondo Beach, Calif., assignors to Thompson Ramo Wooldridge Inc., Los Angeles, Calif., a corporation of Ohio
Filed Apr. 15, 1959, Ser. No. 806,645
16 Claims. (Cl. 60—30)

This invention is concerned with a method and apparatus for controlling air flow and more particularly with a method and apparatus for controlling the mixture of fresh air with the exhaust gas of an internal combustion engine whereby any excess combustibles within the exhaust gas may be oxidized. This application is a continuation-in-part of our co-pending application, Serial No. 787,524, filed January 19, 1959, now abandoned, for a Control Method and Apparatus.

As is known, exhaust gas of an internal combustion engine contains undesirable noxious and toxic compounds as well as hydrocarbons and other smog producing compounds of a combustible nature.

Prior art publications dealing with the cleansing of internal combustion engine exhaust gas suggest mixing the exhaust gas with fresh (free oxyen-containing) air and causing the oxidation or reaction of the mixture to take place at some point within the exhaust system, as in an auxiliary chamber popularly known as an afterburner. Many of these prior art publications discuss various forms of afterburners including those dependent upon the use of a catalytic substance within the afterburner, and show various means for controllably adding fresh air to the afterburner both to promote oxidation of at least some of these undesirable combustibles in the exhaust gas and to cool the afterburner.

In an air addition type afterburner designed to oxidize the smog producing compounds, sufficient oxygen should be supplied to oxidize the combustible content of the exhaust gas. Since both the engine throughput (air and combustibles passing through the engine in a given unit of time) and the amount of combustibles compared to free oxygen available for completely oxidizing these combustibles vary considerably during various engine operating conditions, the necessary amount of fresh or secondary air addition required to obtain exhaust substantially devoid of these unacceptable compounds will also vary. Many of the prior art afterburner systems have not been entirely successful because the obtaining of a satisfactory reaction in the afterburner is dependent upon both the temperature of the mixture within the afterburner and the length of time the exhaust gas resides in the combustion chamber, as well as being sensitive to the amount of oxygen available. If less than a proper amount of secondary air is provided, flameout and/or incomplete oxidation of the combustibles may occur because of oxygen starvation. On the other hand, particularly during operation wherein the mixture supplied to the engine is lean or low in combustibles, the maintaining of a reaction in the afterburner can be made difficult by providing too much fresh air. This difficulty arises from both the cooling effect of the air and the decreased residence time in the reaction chamber of the afterburner that is a consequence of the increased total flow of both exhaust gas and fresh air in the afterburner.

Consider briefly the range of variation of the engine throughput and combustible content of engine exhaust gas for several normal operating conditions. During deceleration, where the engine is effectively used as a brake, the exhaust gas is very rich in combustibles compared to free oxygen while during normal cruise operation the exhaust gas contains a relatively small quantity of combustibles compared to the free oxygen. Excess combustibles may be defined herein as any combustibles which would remain after complete utilization of free oxygen in the reaction of the air-fuel mixture supplied to the engine. The relative concentration of excess combustibles in the exhaust gas varies over a wide range as a function of the engine operation. The amount of fresh or secondary air addition required for complete oxidation of any specific volume or weight of exhaust gas may vary by as much as 35 to 1. In addition the rate of exhaust gas flow, or engine throughput, varies by a factor of as much as 20 to 1 depending on the operating conditions of the engine, such as idling or high speed full throttle operation. The secondary air flow rate must then be controlled in response to at least two determinants, which vary independently, one having a range of variation of 35 to 1 and the other a range of variation of 20 to 1.

As a result of the magnitude of variation in each of these independent air addition determinants in a modern automobile power plant, the secondary air supply must reflect the complex pattern of the engine operating conditions. Thus, in a sense, in a mechanical power supply system including an engine and a carburetor, the problem of excess combustibles emanating from the engine centers around the carburetion system, the heart of which is an air-fuel mixing device known as the carburetor.

The excess combustibles in the exhaust gas, as mentioned above, are largely determined by the equivalence ratio of the fuel-air mixture supplied by the carburetor to the intake manifold of the engine. The equivalence ratio is a precise chemical term defined as the actual air-fuel ratio divided into the stoichiometrically correct air-fuel ratio (complete reaction due to presence of correct amounts of fuel and air). An equivalence ratio of unity defines the chemically correct proportions of oxygen-containing aid and fuel in the mixture whereby complete reaction will combine all of the combustibles with all of the oxygen. An equivalence ratio greater than unity defines an air-fuel mixture which is richer than stoichiometric, whereby excess combustible matter will remain in the exhaust gas after all oxygen has been combined with the combustibles. An equivalence ratio less than unity defines an air-fuel mixture which is leaner than stoichiometric, whereby an excess of oxygen will be present even after all combustibles are oxidized. The equivalence ratio of the air-fuel mixture supplied to the engine is largely determined by the operation of the idle jet, main jet, and power jet of the carburetion system.

Therefore, in accordance with the present invention, the engine speed and the intake manifold vacuum may be employed in combination to yield information identifying each of the possible engine load conditions. As disclosed below proper utilization of these two factors or engine operation determinants allows optimum control of the rate at which additional air is added to exhaust gas entering an afterburner because at any given instant the total weight of additional air necessary to cause complete oxidation of any excess combustibles in the exhaust gas emanating from the engine is precisely predictable as a function of the engine operation determinants including the equivalence ratio of the air-fuel mixture within the intake manifold taken in combination with the throughput of the engine.

Accordingly, one of the most important objects of this invention is to provide a simple and reliable method and apparatus for automatically supplying a desirable amount of additional air to the exhaust gas of a throttle-controlled internal combustion engine over the entire operating range of the engine.

Another object of the present invention is to provide an improved means for regulating the amount of air added to the exhaust gas in accordance with the condition of the exhaust as determined by variations of selected factors which reflect the operating condition of the engine supplying this exhaust.

Another object of the present invention is to provide control means which will respond to factors indicative of each of several operating regimes of the engine to cause the provision of additional air in substantially direct proportion to the excess combustibles of the exhaust gas which are to be oxidized in an air addition type afterburner.

A further object is to provide additional oxygen-containing air to an air addition afterburning system at a rate dependent upon the rate of flow to the afterburning system of any excess combustibles in a gas containing combustible constituents.

In the present invention, these objects will be carried out by a control means responsive to factors indicative of the air-fuel intake equivalence ratio, and means providing additional air to the exhaust gas in accordance with this control means and in accordance with the throughput of the engine.

Briefly, in one embodiment of the present invention, there is provided an auxiliary positive air displacement means for supplying air from the atmosphere to the input of an afterburner. Since, during many operating conditions, secondary air should be supplied at a rate which is a positive function of the engine speed, the air supply means is drivably connected to the engine. Since various conditions influencing the equivalence ratio of the air-fuel mixture within the intake manifold are a function of the manifold vacuum, a throttling valve responsive to this vacuum is installed in the circuit with the air supply means to dump a portion of the fresh air not required by the afterburner. This dump operation is preferably modified by the addition of a hydraulic resistance between the valve and the atmosphere. It will become apparent from the following discussion that this embodiment of the invention will provide air in accordance with the amount of exhaust gas flow from the engine and the excess combustibles in the exhaust gas.

The subject matter which is regarded as this invention is particularly pointed out and distinctly claimed in the concluding portion of this specification. The invention, however, as to its organization and operation, together with further objects and advantages thereof will best be understood by reference to the following description taken in connection with the accompanying drawings, in which:

FIG. 1 shows a simplified layout of one embodiment of the invention;

FIG. 3 shows curves of the pressure drops across elements of the dump system compared to the dump flow rate;

FIGS. 4a and 4b are detail views of the flow pattern within an element of one embodiment of the dump resistance during differing operating conditions;

FIGS. 5a, 5b and 5c are detailed views of various positions of the valve in the dump regulator shown in FIG. 1;

FIG. 6 is another embodiment of a valve arrangement suitable for use in the regulator shown in FIG. 1;

FIG. 7 shows a simplified diagram of another embodiment of the invention;

FIGS. 8 and 8a show a pump suitable for use in a further embodiment of the invention;

FIG. 9 shows a simplified layout of another embodiment of the present invention;

FIG. 10 is a curve showing the rate of engine air flow for several throttle valve settings as a function of engine speed; and FIG. 11 is a curve showing the rate of engine air flow for several manifold vacuums as a function of engine speed.

Figure 2A:
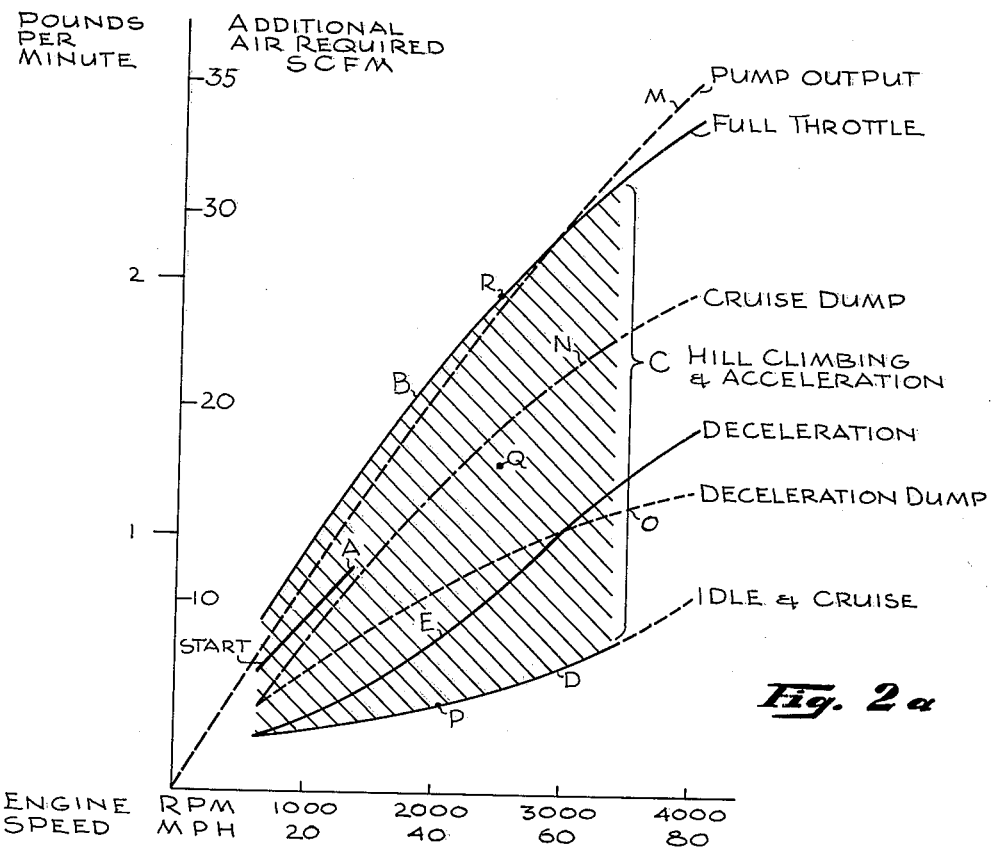
FIGS. 2a and 2b are curves showing respectively the relative air addition requirements and rate of engine air throughput for normal operating conditions, as a function of engine speed.

Although not limited to automotive gasoline internal combustion engines, certain embodiments of this invention have been tested on a late model automobile, and will be so described.

Referring now to the drawings, in which like numerals indicate similar parts, in FIG. 1 there is shown an engine 10 connected by an exhaust gas pipe 11 to an afterburner 12, of the type enhancing the complete oxidation of any combustibles in the exhaust gas, particularly when the equivalence ratio of the air-exhaust gas mixture in the afterburner is slightly less than 1. It should be noted that the relative rate of combustible flow through the exhaust gas may be affected more by the completeness of the combustion within the engine 10 than by the equivalence ratio of the air-fuel intake mixture supplied to the engine. Thus even when the equivalence ratio of the air-fuel mixture is 1, there may be combustible content in the exhaust gas, because only 90 to 97% of the fuel and air are reacted in the engine 10. On the other hand, complete reaction within the engine, wherein all of the free oxygen content in the air-fuel intake mixture supplied to the engine was combined with the combustibles would result in combustibles in the exhaust gas equal to only the excess combustibles. A comparison of the combustibles per unit weight of exhaust gas with the free oxygen in the exhaust gas or simply a measurement of the rate of combustible flow within the exhaust gas pipe 11 will not of itself define clearly or simply the rate of additional air required to obtain a desired equivalence ratio of the air-exhaust gas mixture in the afterburner 12. Therefore in the following discussion the term "equivalence ratio of the engine throughput" is intended to refer to the equivalence ratio of the air-fuel mixture supplied to the engine. Similarly the equivalence ratio within the afterburner 12 is determined by the amount of fuel and air supplied to the engine system plus the additional air provided by an air addition system discussed below.

This equivalence ratio is obtainable by dividing the rate of supply of the pounds of air (engine air flow plus air addition) supplied to the afterburner 12 into a factor equal to a constant times the rate of supply of the pounds of fuel, wherein the constant is equal to the number of pounds of air required per pound of fuel to provide a stoichiometric mixture of air and fuel. Thus when the engine 10 is receiving an air-fuel mixture having an equivalence ratio of one, the air supply means should provide the necessary air for stoichiometric mixture, and experience has shown that additional air at a rate equal to approximately 5.3% of the air flow rate through the engine system is desirable. With this air supply the equivalence ratio of the air-exhaust gas mixture within the afterburner 12 will be approximately .95.

With an equivalence ratio of less than 1 in the afterburner mixture, reaction may be complete enough to release to the atmosphere through a tailpipe 13 only exhaust having substantially no noxious matter. In one embodiment tested, the engine 10 is drivingly connected by a means such as a V-belt 15 to a positive displacement type pump 16 for providing a fresh air supply to an air conduit 18 when the engine is operating. The air conduit 18 is connected to conduct air to the inlet end of the afterburner 12 and in the embodiment illustrated is shown connected into the exhaust pipe 11.

According to this embodiment of the present invention the air conduit 18 is provided with an aperture or port means 20 which will allow the escape of at least a portion of the air supplied by the pump 16 during at least some operating conditions. The exhaust port 20 is connected to a dump system including a regulator 22 provided with a regulated dump control valve 24 which, when open, allows air to pass therethrough to a hydraulic restrictive device hereinafter referred to as a dump resistance element 26 and thence to the atmosphere.

It should be noted that although engine misfiring may occur, allowing the transmission of considerable amounts of unburned fuel into the exhaust gas, this does not materially affect the rate of additional air required to provide a desired equivalence ratio of the air-exhaust gas mixture in the afterburner because the unburned combustibles in the exhaust are accompanied by an amount of oxygen-containing air whereby the excess combustible content of a given weight of exhaust gas from a cylinder which is misfiring is no different from that received from cylinders which are firing properly.

The operating conditions of an engine can be described in terms of six regimes in its engine operating spectrum. These basic regimes are as follows:

(1) During starting, the exhaust is extremely rich (the engine throughput having an equivalence ratio of about 1.5) because of the operation of both the idling jet of the carburetor and the automatic (or manual) choke. When an automatic choke is provided, it embodies a temperature sensitive element which regulates the operation of the choke valve. At the same time the engine is being warmed, excess combustibles within the exhaust gas resulting from this type of operation may be used to heat the afterburner 12 to a suitable operating temperature. For completing the combustion of the exhaust combustibles from a typical automobile engine 10 having approximately 280 cubic inch displacement, approximately 5 s.c.f.m. (standard cubic feet per minute) air addition is required, assuming that the engine 10 is idling at a speed such as 600 r.p.m. (The s.c.f.m. are each equivalent to a given weight (.075 pound) of air per minute, expressed in terms of cubic feet per minute at a standard temperature of 70° F. and a standard pressure of 1 atmosphere.) This corresponds to a mixture ratio of one part fresh air to two parts of exhaust gas. If, on the other hand, the engine were immediately raced to a higher speed so as to increase the engine throughput above the normal 10 s.c.f.m., or .75 p.p.m. (pounds per minute), at idling, a commersurately greater air addition would be required. The starting regime is defined by the operation of the choke.

(2) When the throttle is opened to maximum or full throttle position, the manifold vacuum decreases to a magnitude below about 10″ of mercury at which vacuum the carburetor power jet opens to supply additional gasoline whereby the equivalence ratio of the engine air-fuel mixture is of the order of 1.2. The condition of carburetor power jet operation defines the full throttle regime as discussed herein. During this condition the air added to the exhaust gas should be in a ratio of approximately 1 part air to 6 parts exhaust gas. The engine throughput may vary in this regime between about 70 s.c.f.m., or 5.25 p.p.m., at 1000 r.p.m. to 220 s.c.f.m., or 16.5 p.p.m., at 4000 r.p.m. The full throttle regime of operation may occur during acceleration, high speed travel, or periods when the engine is required to deliver maximum power because of load conditions such as the pulling of a trailer or powering of a vehicle up a steep hill. It should be noted that the position of the throttle valve itself will not provide an accurate indication of full throttle operation within the purview of the present invention. In the first instance complete depression of the throttle mechanism results in an increase in the flow rate of the air-fuel mixture to the engine with a correlative decrease of the intake manifold vacuum which causes operation of the power jet after a time lag depending on the carburetor characteristics. Moreover, the operation of the throttle valve to less than maximum opening, especially during low speed operation and when the engine is loaded, may cause a manifold vacuum which will open the power jet for a short period of time while the engine is accelerating. On the other hand, similar operation of the throttle valve under no load or light load conditions, may not cause operation of the power jet because the engine speed will respond quickly enough to maintain manifold vacuum at a value above that at which power jet operation is produced.

(3) Hill climbing and acceleration air addition requirements vary between those of cruise and those of full throttle depending upon the engine speed and the throttle opening. In this intermediate power delivery regime, the main jet and to a minor extent the idle jet of the carburetor supply fuel to the engine. However, as the throttle valve position is varied, the engine throughput varies whereby the flow rate of fuel induced from the main jet varies proportionally. Although the equivalence ratio of the engine air-fuel mixture may remain constant, the flow rate of excess exhaust combustibles increases because of the increase in throughput at any given engine speed in this regime.

(4) When the automobile is cruising at speeds above idle and below the point at which the carburetor power jet is opened, which may be at about 70 miles per hour, the engine operates on a lean mixture with an equivalence ratio in the vicinity of 1, and the resulting exhaust gas has only a small concentration of combustibles. While the engine throughput during cruise operation may vary from about 10 s.c.f.m. or .75 p.p.m. to 120 s.c.f.m., or 9 p.p.m., the mixture ratio of the added air to the engine throughput should approach approximately 1 to 10 at high throughputs and a greater ratio of additional air as the cruise regime blends into the idle regime. All of this assumes a normal road load such as a vehicle carrying three passengers at a substantially constant speed over a substantially level highway.

(5) During idling the exhaust gas is relatively rich; the engine air-fuel mixture equivalence ratio being as high as 1.3, because the idling jet is operative. However, the choke is inoperative during the idling regime when the engine is warm. With an idle speed of 600 r.p.m., one engine tested had a throughput of 10 s.c.f.m. Approximately 2 to 3 s.c.f.m. air addition is required for normal idling speeds as would be encountered at stoplights, etc.

(6) During closed throttle deceleration, when the engine is effectively used as a brake, the exhaust gas is usually much richer than the exhaust gas at idle. Because of the fact that during deceleration the throttle valve is completely closed, any air supplied to the engine 10 must pass through a very small opening or orifice. A large pressure differential across this small opening will cause air flow therethrough to be at a high velocity. At high air velocity the maximum air flow through an orifice is limited according to the hydraulic principles which prevent the air flow velocity through an orifice from exceeding the speed of sound, regardless of the magnitude of pressure differential across the orifice. Thus, during the deceleration regime the throughput of the engine 10 is substantially independent of the speed and in one engine tested was 10 s.c.f.m. Since operation of the engine in the deceleration regime may cause air-fuel mixture equivalence ratios as great as 2 or more approximately 10 s.c.f.m. air addition or greater is desirable for this type of operation. It has been noted that even if there is excess air addition during these conditions it is not likely to cause any problem because the total throughput of the afterburner is very low so that residence of the air-exhaust mixture in the afterburner is sufficient for complete reaction. Moreover, with the high flame temperatures resulting from the richness of the mixture, any cooling by added air is beneficial rather than harmful and protects the afterburner materials from excessive temperatures.

In order to provide the performance characteristics demanded by the modern automobile owner, automobile manufacturers have designed automobile power supply systems which provide distinguishable power delivery regimes including an emergency or maximum power delivery regime and an efficient (or minimum equivalence ratio air-fuel mixture) power delivery regime referred to above as the full throttle regime having an equivalence ratio of the intake mixture of 1.3, and cruise regime, having an equivalence ratio of he intake mixture of 1. Thus the engine system is designed to deliver controlled magnitudes of power throughout various power delivery regimes selected by the automobile operator.

Referring again to FIG. 1 since the pumping action of the positive displacement pump 16 may be designed to be substantially proportional to that of the engine 10 during full throttle regime over the speed range of operation of the engine, the direct driving connection 15 between the engine 10 and the pump 16 tends to cause a variation of secondary air flow rate in proportion to the engine throughput. This is true because during most regimes the engine throughput is substantially proportional to the engine speed, provided the throttle position is not changed much, and because the output of the positive displacement pump is also substantially proportional to the engine speed. Two functions proportional to a third are proportional to each other.

In order to provide proper control of the rate at which fresh air is mixed with engine exhaust gas, it is desirable to determine the equivalence ratio of the air-fuel mixture supplied to the intake manifold of the engine during several operating regimes. In the modern automotive carburetion system wherein the throttle valve setting in combination with the engine speed controls the vacuum of the intake manifold and controls the fuel supply to the engine, an indication of equivalence ratio of the engine throughput is obtainable from the vacuum within the intake manifold of the engine 10. A vacuum conduit 30 is normally connected through a three-way valve 32 to an intake manifold vacuum conduit 34 and ultimately to the intake manifold of the engine 10 so that the pressure changes in the vacuum conduit 30 reflect changes in vacuum within the engine intake manifold. The vacuum conduit 30 is connected to the sensing means of the dump regulator 22. With this arrangement, during normal operation of the engine 10 the manifold vacuum controls the restriction offered by the regulator 22, which restriction in turn determines, together with the characteristics of the dump resistance element 26 and the afterburner back pressure (causing a varying pressure of the exhaust gas in the exhaust manifold and exhaust gas pipe), the portion of the air pump output that is dumped to the atmosphere. In normal operation the valve 24 in the regulator 22 opens as the manifold vacuum increases and is completely open for moderate and high vacuums so as to insure maximum dumping. The reason for this arrangement will be made apparent in later discussions.

During the starting cycle when both the idle jet and automatic choke 35 are in operation, the exhaust gas is extremely rich in combustibles and the total pump output at the given engine speed should be supplied to the afterburner. Thus there should be no dumping during starting despite the fact that the manifold vacuum is very high. One simple means of accomplishing this is to connect a choke linkage 36 to the three-way valve 32 to controllably vent during the starting regime the vacuum conduit 30 to the atmosphere by means of an atmospheric port conduit 37, thus keeping the valve 24 closed and preventing dumping during the starting regime. When an automatic choke 35 operates the linkage 36 to seize control of the dump regulator 22, the rate of additional air supply is controlled as a function of the temperature of the engine 10.

The dump regulartor 22 is provided with a casing 40 which supports the valve 24 and encloses a plurality of fluid chambers including an atmospheric pressure chamber 41, a manifold vacuum chamber 42, an air inlet chamber 43 and an air outlet chamber 44 with the valve 24 controlling the fluid connection between the air inlet and air outlet chambers 43 and 44.

The casing 40 also defines a plurality of openings to these various chambers. An aperture 50 allows virtually unrestricted air flow between the atmosphere and the chamber 41; an aperture 51 is provided between the chamber 42 and the vacuum conduit 30; an aperture 52 of the chamber 43 admits fluid from the exhaust port 20 of the air conduit 18 and an aperture 53 is provided between the chamber 44 and the dump resistance 26. Moreover, in the embodiment shown, an aperture 54 is provided to substantially enclose an adjustable bias mechanism consisting of a stuffing box 55 secured to the casing 40 and enclosing an adjustable bolt 56 having a platform 57 at its inner extremity adapted to support a regulating biasing spring 58.

A flexible diaphragm 60 is secured between the atmospheric pressure chamber 41 and the manifold vacuum chamber 42. Thus, as the intake manifold vacuum variations are sensed within the vacuum conduit 30, the pressure acting on the bottom of the diaphragm 60 will vary to cause a changing counteraction of the bias of the spring 58 so as to control the position of the valve 24. Obviously the power obtainable is sufficient to move the relatively light weight control valve 24 since the manifold vacuum system has sufficient power to operate automobile windshield wipers, etc.

In order to operate the dump regulator valve 24 in accordance with air addition requirements as sensed by relative variation of the vacuum within the vacuum chamber 42, the diaphragm 60 acts on a linkage device shown as a push rod 62, which in turn supports the valve 24 by passing through an aperture defined in the lower well of the chamber 42. In operation the dump regulator 22 will control a desired dumping of a portion of the air provided by the pump 16 depending on the pressure differential between the chambers 41 and 42 and the bias provided by the spring 58.

In order to eliminate any undesirable variation of opening of the control valve 24 in accordance with changes of engine throughput (as sensed by the valve 24 in the form of variation of back pressure of the afterburner 12) there is provided a balancing piston 63 having substantially the same effective cross-section surface sensitive to differential air pressure between the atmosphere and the chamber 43 as the cross-section of the top surface of the valve 24, which is sensitive to air pressure differential between the chambers 43 and 44. Another valve arrangement which may be designed to remain relatively insensitive to the pressure drop across it, would be a butterfly valve (discussed below in connection with FIG. 6) having substantially equal vane areas on each side of its pivot axis.

To eliminate the possibility of hot exhaust gases flowing through the conduit 18 from the exhaust pipe 11 to the regulator 22 and the dump resistance 26 there is provided a check valve 65 between the exhaust pipe 11 and the port 20.

Although various carburetion systems may be designed to cause the effective operation of the idle jet, power jet and main jet of the carburetor at somewhat different intake manifold vacuums, the intake manifold vacuum of a typical gasoline engine 10 as sensed in the vacuum conduit 30 will vary substantially in accordance with the following table to control the opening of the valve 24 as indicated:

| Manifold vacuum | Engine operating condition | Valve position |
|---|---|---|
| Ineffective | Starting (automatic choke active). | Closed (no dump). |
| 0″–10″ Hg | Full throttle (carburetor power jet active). | Do. |
| 10″–14″ Hg | Acceleration or hill climbing | Partially open. |
| 14″–20″ Hg | Cruise and idle (idle jet active or inactive). | Maximum opening. |
| 20″–24″ Hg | Deceleration (throttle closed) | Do. |

With signal information from the intake manifold vacuum readily available together with the engine speed signal information, FIG. 1 illustrates a most economical control system which can, by providing sufficient pump capacity and by controlling the dumping of excess air, supply the proper flow of secondary air to the afterburner 12 in accordance with the engine operation determinants including both throughput and equivalence ratio.

Referring now to FIG. 2a which shows the curves A, B, D and E of the air addition requirements as a function of engine speed for different engine operating regimes and wherein the scale of the abscissae is in r.p.m. and the scale of the ordinates is in both s.c.f.m. and p.p.m. As is apparent from the curves of FIG. 2a, since the engine system is limited in speed between a minimum or idle speed and a maximum operating speed, it may be said that the equivalence ratios during both the full throttle regime and the cruise regime are substantially fixed at respectively different values throughout restricted ranges of engine speeds. The curve A represents the air addition requirements during the starting cycle of a car when the carburetor choke is active. Usually starting speeds will remain below 1500 r.p.m. The curve B represents the air addition requirements during full throttle operation when the carburetor power jet is active and the maximum weight of combustibles per unit time is flowing through the exhaust pipe 11. The region C, hill climbing and acceleration operation, is the shaded area between curves B and D. The curve D represents the idle and cruise characteristics of the air addition requirements. The curve D does not approach zero because of the action of the idle jet used in modern carburetors which causes an increase of equivalence ratio of the engine throughput at low speeds. The curve E represents the air addition requirements during deceleration when the carburetor throttle valve is substantially closed.

In most modern automobiles, it is rare to operate for long periods of time under full throttle conditions because, with the amount of horsepower available, desired operating speeds are quickly obtained. However, during steep hill climbing or rapid acceleration, full throttle conditions are often encountered for short periods of time so that the pump 16 must be capable of providing a proportionately high rate of additional air supply. The pump output is shown by a curve M (dashed lines) in FIG. 2a. The curve M is essentially coincident with the full throttle curve B. The termination (at approximately 70 m.p.h.) of the cross-hatched region C between the curves B and D represents the speed at which the power jet opens during cruise operation of one carburetion system tested.

Figure 2B:
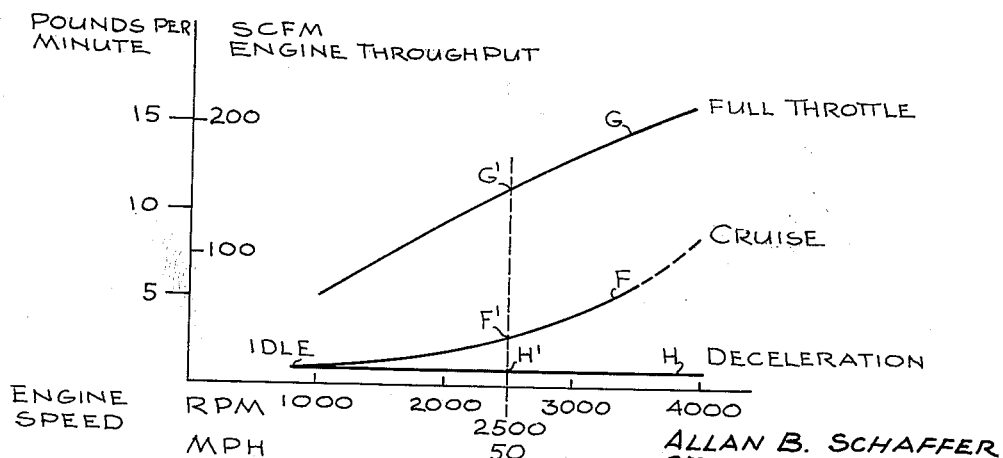

Referring now to FIG. 2b wherein there are presented for different operating conditions, curves of the relation between engine speed and throughput, for one engine tested, with the scale of the abscissae being in r.p.m. and the scale of the ordinate being in s.c.f.m. Assume for a moment the engine 10 is operating at 2500 r.p.m. at which speed (approximately 50 m.p.h.) the pump 16 is capable of providing 25 s.c.f.m., as shown by the pump output curve M in FIG. 2a. In FIG. 2b the points F', G' and H' on the cruise operation curve F, the full throttle operation curve G, and the deceleration curve H, respectively, indicate the corresponding values of engine throughputs at this speed. For example, when the engine of 280 cubic inch displacement is cruising at 2500 r.p.m. it will deliver into the exhaust pipe 11 approximately 45 s.c.f.m. (F') of exhaust gas. At full throttle the exhaust gas throughput will be approximately 160 s.c.f.m. (G'). At closed throttle (idling or deceleration), the throughput is about 10 s.c.f.m. (H'). During the cruise condition referred to above, the fresh air should be added to engine exhaust in accordance with a mixture ratio of one part air to ten parts (or less) exhaust gas, while during full throttle the ratio should be somewhat greater, as for example, one part air to six parts exhaust gas, and during deceleration, a mixture ratio of one part air to one part exhaust gas, or greater is desirable. Thus, as indicated, in FIG. 2a, at 2500 r.p.m. the necessary air addition for cruise is only 4 s.c.f.m., while for full throttle it is 26 s.c.f.m., and for deceleration it is about 10 s.c.f.m.

For idle and cruise operation it is desirable to dump that portion of the fresh air pump output not required in the afterburner. In other words, during the idle or cruise regime, the difference between curves M and D at any speed in FIG. 2a represents the rate at which air should be dumped. This difference, the rate of dumping, is given by curve N in FIG. 2a.

Since the vacuum chamber 42 senses the engine intake manifold vacuum and since full throttle is defined as operation when the manifold vacuum is less than about 10″ Hg the bolt 56 may be adjusted to provide a bias spring force on the valve 24 such that the valve 24 will be completely closed at a manifold vacuum of 10″ Hg or less. Under these conditions no air will be dumped and the entire pump output will flow to the afterburner 12. The desired amount of air addition will be supplied to the afterburner provided that the pump 16 is sized to deliver exactly the air addition requirements at full throttle, namely ⅙ of the engine throughput, in the example under consideration. Further, the spring characteristics may be selected to regulate the control valve 24 whereby as the vacuum increases above 10″ Hg the valve 24 will open an increasing amount until it is completely open at vacuums of about 14″ Hg and greater, as required during the cruise, idle and deceleration operating regimes. It should be noted that the inherent operation of an internal combustion engine as described above causes a substantially greater amount of engine throughput during cruise operation than during deceleration. This greater amount of engine throughput, as shown in FIG. 2b, will cause a greater throughput in the afterburner 12 whereby the back pressure of the afterburner during cruise will be larger than during deceleration. As a result the amount of air passing through the dump resistance element 26 at any given engine speed is greater during cruise than during deceleration. Therefore, because of the tailoring of the dump resistance element, as explained below, the cruise dump curve N is substantially above the deceleration dump curve O because of the difference of back pressure across the afterburner in the cruise and deceleration regime.

In order to control the portion of the secondary air dumped to the atmosphere when the dump regulating valve 24 is fully open, as during idle, cruise and deceleration operating regimes, the dump resistance element 26 is provided. As stated hereinbefore, the restriction to air flow to atmosphere offered by the resistance element 26 is thus responsive to varying pressure in the exhaust manifold and exhaust gas pipe during such regimes. Typical resistance characteristics for elements of the dump system are shown in the curves of FIG. 3 wherein the scale of the abscissae is the rate in s.c.f.m. at which air passes through the various elements of the dump system and the scale of the ordinates is the pressure drop measured across the entire dump system and certain elements of the dump system. The curve J represents the desired overall flow resistance characteristics of the dump system which comprise the dump regulator 22 taken in combination with the dump resistance element 26. This flow-resistance characteristic, when taken in combination with the pump air supply characteristic M (FIG. 2a), will provide, at any given engine speed, the required rate of air dumping defined by curve N in FIG. 2a. The curve K in FIG. 3 indicates the actual pressure drop across the dump regulator 22 as described in FIG. 1; and the curve L represents the pressure differential between the curves J and K. The curve L is therefore the most desirable resistance characteristic for the dump resistance element 26 and it is preferred that the dump resistance element be tailored to produce this characteristic.

In one of its embodiments the dump resistance element 26 may be tube pack in form and may be constructed from a 1½″ pipe 66 (FIG. 1) having a portion (such as 7½") thereof substantially filled with a plurality (such as 368) of tubes 68, each having a lineal aperture therethrough of a diameter of .043". This produces a laminar flow within the dump resistance element 26 for relatively low dump rates whereby a linear relationship between the volume of air flow and the pressure drop exists. Moreover with this particular construction relatively high dump rates will produce a turbulent flow through the dump resistance element 26 whereby a quadratic relation exists between the volume of the air flow through and the pressure drop across the dump resistance element 26. The tube pack is designed specifically to provide the transition from laminar to turbulent flow at an intermediate dumping rate. With such a construction it is possible to produce a dump resistance element having the characteristic as indicated by curve L of FIG. 3, since curve L tends to be linear at low dumping rates and quadratic at high dumping rates.

Although it is possible to make a dump resistance element by combining laminar and turbulent resistance elements in series or parallel, the above-defined tube pack will provide a closer approximation to the curve L than other resistance designs wherein the resistance elements are permanently connected in series or parallel.

The tailoring of the dump resistance element 26 may be understood more completely by reference to FIGS. 4a and 4b, wherein there is indicated the variation of longitudinal velocity across a tube 68 for laminar and turbulent flow conditions respectively. The change of pressure along a given length of the tube 68 is a function of the velocity of flow (which is determined by the volumetric flow rate of air and the cross-section of the tube). This pressure drop increases linearly with velocity (or flow rate) so long as the flow is laminar; that is, so long as the Reynolds number characterizing the flow remains below its critical value, which is about 2000. Reynolds number is the dimensionless parameter obtained by multiplying the flow velocity by the tube diameter and dividing the product by the kinematic viscosity of the fluid flowing through the tube 68. Flows characterized by a Reynolds number below the critical are laminar, whereas those characterized by a Reynolds number above the critical are turbulent. During linear resistance conditions (laminar flow) the velocity distribution across the diameter of the tube (as indicated by the vectors 70 in FIG. 4a) is parabolic in nature. The velocity distribution for a typical turbulent flow is indicated by the cross-sectional view shown in FIG. 4b, where the vectors 70' indicate that a major portion of the fluid is traveling at or near the maximum velocity. This results in a much larger velocity gradient along the inner surface of the tube 68. Since pressure drop is determined by the velocity gradient at the surface, the pressure drop is considerably greater in turbulent flow than in laminar flow. With turbulent flow the pressure drop increases as the square of flow rate. Thus laminar flow gives a linear variation of pressure drop with flow rate whereas turbulent flow gives a quadratic variation with the prevailing variation depending upon the Reynolds number and hence upon the magnitude of the dump flow rate.

By selecting the diameter of the tubes 68, the number of tubes employed in the dump resistance element 26, and the length of the tube pack, it is possible to provide the desired linear pressure drop (attending laminar flow) for low dumping rates and at the same time to provide quadratic pressure drop (attending turbulent flow) for higher dumping rates with the flow in the tubes 68 passing through the critical Reynolds number at an intermediate dumping rate. In the embodiment tested, which was the above-mentioned tube pack consisting of 368 tubes, each having an inner diameter of .043" and a length of 7½", the desired resistance characteristics described above were produced and curve L was closely simulated.

It is clear from the above discussion and particularly from FIGS. 2a and 2b that there are substantial differences between the additional air required throughout cruise and full throttle regimes. Variation of the opening of the control valve 24 as shown in FIG. 5 will provide proper dump control in the regime C, which is associated with acceleration and hill climbing. When it is desired to increase the power output of the engine 10, the accelerator is depressed and the air addition requirements will change from the cruise curve D toward the full throttle curve B. Since the available vacuum signal acting on the diaphragm 60 changes from 14" Hg, or above, toward 10" Hg, it is a relatively simple matter to design the valve biasing system 54—58 to cause the valve 24 to be fully open (FIG. 5a), at 14" Hg and above; partially open (FIG. 5b), at 12" Hg, and fully closed (FIG. 5c), at 10" Hg and below, corresponding respectively to cruise (such as point P, FIG. 2a), acceleration (such as point Q) and full throttle (such as point R). The throttling by the control valve 24, when it is at an intermediate position, decreases the portion of air that is dumped. This action supplies the extra air needed by the afterburner 12 during acceleration and hill climbing. During the hill climbing and acceleration regime the position of the carburetor throttle valve will affect the air supply and the amount of fuel being supplied by the main jet whereby at low speeds an increase of the opening of the throttle valve will cause an increase of the engine throughput and the main jet will provide more excess combustibles per revolution of the engine. When the equivalence ratio is relatively constant during main jet operation, the excess combustibles per unit weight of engine exhaust gas will remain fixed and the carburetion system will supply fuel with the resulting flow of combustibles being in accordance with the engine throughput. Thus opening of the throttle valve a greater amount than necessary for the cruise regime at any given engine speed will result in an increase in the flow of combustibles per unit time. The air requirements during these conditions are always intermediate to those of the cruise and full throttle regimes, and the intermediate valve position (FIG. 5b) provides the desired intermediate air supply to the afterburner 12.

As mentioned above, the dump system of FIG. 1 is provided with means for compensating for the effects of undesirable variations in the afterburner back pressure as a result of attendant changes in the engine throughput. Such means are provided, in the arrangement of FIG. 1 by a suitable proportioning of the area of the bottom surface of a balancing piston 63 as described. An alternative arrangement is, however, shown in FIG. 6. Referring now to FIG. 6 there is shown a butterfly or vane type valve 74, pivotably biased about a pivot 75 by a bias spring 58' and operable by the push rod 62. Since, when the valve 74 is open or closed, the pressure acting on opposite vanes thereof is substantially the same, a balancing piston of the type shown as 63 in FIG. 1 is not required.

It is contemplated that in place of the direct engine connected pump a variable slip clutch connected between the engine 10 and the pump 16 can function as a variable air addition means when the driving connection through the clutch is controlled in accordance with the equivalence ratio of the engine throughput. One clutch suitable for this is known as an eddy current clutch. Similarly a variable-pitch pulley drive will cause desired air supply. Moreover, a variable air addition may be supplied by a variable displacement pump. In each of these three embodiments it is not necessary to dump any air. The pump always has the maximum required capacity, and in lieu of dumping air, the speed and/or displacement of the pump is varied.

As an alternative to the dumping of excess air or regulation of the speed or displacement of the pump as discussed above, it is apparent that with certain types of pumping mechanisms, the pump flow to, through or from the pump device can be throttled to provide the desired regulation in accordance with the equivalence ratio signal information. Similarly, a desirable result is obtainable by the use of a plurality of pumps with one pump designed to provide the minimum requirements and other pumps connectable to provide intermediate and maximum secondary air requirements. It is also possible to have the pump driven by an electric motor which receives current from the automobile generator. The speed of the electric motor is easily controllable in accordance with the engine operation determinants including the engine throughput and the equivalence ratio. In other words, this electric motor is driven as a positive function of the amount of excess combustibles appearing in the engine exhaust gas per unit time.

The embodiment of this invention previously described proposed that the control of the rate at which additional air is supplied to the afterburner 12 be in accordance with both engine throughput and equivalence ratio of the air-fuel mixture supplied to the engine. Thus oxygen-containing air pumping means is controlled as a function of the engine speed and air dumping is controlled as a function of the intake manifold vacuum and the afterburner back pressure as determined by its throughput. However, the engine throughput and equivalence ratio of the air-fuel mixture can be detected in other ways. For example, one may sense directly the engine throughput by some means such as the pressure drop across a conventional carburetor air filter of the engine 10. However, care must be taken in the interpretation of a pressure drop signal across a component of the engine system to account for any non-linearity of the element producing the signal, which non-linearity might occur because of turbulent flow therethrough or because of change of operation of the particular element during various operating regimes of the engine. Moreover, the equivalence ratio of the air-fuel intake mixture to the engine is obtainable by sensing directly the excess fuel or combustibles in the intake manifold, in the exhaust from the engine, or in the exhaust from the afterburner by any one of several known devices including a thermal-conductivity meter. Furthermore, indirect signaling sources such as the throttle position, the translational speed of the vehicle, or the gasoline flow rate, will provide control signal information which is functionally related to the throughput and the equivalence ratio of the engine-intake mixture. It will be noted that the throttle position should be interpreted in combination with the speed of the engine or some other engine operating determinant to provide either throughput or combustible flow rate information; also the speed of the vehicle as indicated by the speedometer should be interpreted in terms of the particular gear ratio in effect at any given instant; and the gasoline flow rate indicates the total amount of air necessary whereby signal information, depicting the rate at which fresh air is needed, is obtainable by subtracting throughput signal information from the gasoline flow rate signal information. Furthermore, it is significant that most of the control signal informations described in this paragraph require substantial amplification in order to produce desired control of a secondary air supply means. One reason that engine speed and manifold vacuum have been used in the embodiment described above is that such signal information can in fact, be employed directly, as in FIG. 1, to operate the pump 16 and the dump control valve 24 without the use of amplifiers or complex signal interpretation mechanisms.

Another arrangement utilizing the methods of this invention is shown in FIG. 7, wherein two pumps 16' and 16$_a$' are provided with a three-way valve 80 connected between the outputs thereof. The valve 80 is operable in accordance with a manifold vacuum sensing arrangement 81 which arrangement is similar to that discussed in connection with FIG. 1. In the embodiment disclosed in FIG. 7 the signal information controlling the push rod 62 represents the pressure differential between the chambers 41 and 42. This information is, in effect, utilized to energize an amplifying control device 82 so that when additional air is required, the valve 80 will connect the output of the pump 16$_a$' to be additive to the output provided from the pump 16' to the conduit 18'. In addition to the valve 80, the control device 82 is connected to control a variable pitch pulley drive mechanism 85 whereby the output of pump 16$_a$' will vary in accordance with excess combustibles per unit time in the engine exhaust gas. By the proper use of a regulation system responsive to engine operation determinants as discussed above, the pulley drive mechanism 85 will be controlling during the hill climbing and acceleration regime. It is contemplated that the three-way valve connection 80 and/or the pulley mechanism 85 will cause the pumps 16' and 16$_a$' to provide a predictable and desirable rate of additional air to meet the afterburner system requirements such as those shown in FIG. 2a. It is apparent from the discussion in this paragraph that the two pumps 16' and 16$_a$' and the variable pulley drive mechanism 85 are equivalent to a variable displacement pump, at least to the extent that the effective displacement thereof may be varied in accordance with signal information representative of engine performance.

Pumps other than the positive displacement type can be used in this invention, but most others (i.e., centrifugal pumps and venturi induction pumps) require more complex control systems because, unlike positive displacement pumps, the rate of air supplied thereby is not only dependent on the speed at which such a pump is driven but also is usually strongly dependent upon the back pressure. A pump which is attractive for incorporation into the air addition system described in this invention is depicted in FIG. 8 wherein the perspective view is expanded to illustrate internal structure of a pump 90, and FIG. 8a where a cross-section view is shown. The pump 90, which is sometimes referred to as a "drag" pump, has performance characteristics intermediate to those of a positive displacement pump and a centrifugal pump. A positive displacement pump is characterized by the providing of air in accordance with its speed whereby substantial air flow resistance will result in a high pressure developing across the pump and substantial losses in pumping efficiency. On the other hand, a centrifugal pump is suitable for the maintaining of a constant pressure differential thereacross because of the characteristic of being dependent of back pressure. Thus, it is usually undesirable to throttle a positive displacement pump and it is usually undesirable to use a centrifugal pump in a system that requires increased pumping rates at the same time the back pressure is increasing.

Referring again to FIGS. 8 and 8a, the drag pump 90 is provided with a rotatable member 91 defining an annular recess 92 on one surface thereof with a plurality of arcuate vanes 93 within the recess 92 which act as a dams preventing relative air flow annularly within the recess 92. Relative movement of the vanes 93 will induce air flow in a nonrotatable member 94 having a matching recess 96 matching most of that of the rotatable member recess 92 with an inlet port 98 defined at one end thereof and an outlet port 99 at the other. Between the inlet port 98 and the outlet port 99 is provided a solid portion 100 which forms a fluid dam in the annular recess 96. When the rotatable member recess 92 mates with the nonrotatable member recess 96, the space defined thereby is substantially toroidal whereby movement of air induced by the movement of the rotatable member 91 will induce a similar movement in the recess 96. In some respects the rotatable member 91 and vanes 93 are similar to equivalent elements of a fluid clutch whereby rotation thereof will cause motion of the fluid within the recess 96. Since with the direction of rotation of the rotatable member 91 indicated, the fluid motion is generally from the inlet port 98 toward the outlet port 99, fluid will be pumped through the drag pump 90. The solid portion 100 between the ends of the recess 96, should have a tangential length greater than the distance between two adjacent vanes 93, whereby at least one vane will be positioned to prevent undesirable leakage from the region of the outlet port 99 toward the inlet port 98. The pressure and volume of air output of this pump may be varied within certain limits by selective throttling. Moreover the drag pump 90 may be designed to provide additional air suitable for the maximum air addition requirements of the full throttle regime of the engine 10, and its output can be controlled readily by connecting a throttling valve 101 for restricting air flow to the inlet port 98. It is contemplated that a driving means including an element such as a pulley wheel 102 for powering the rotatable member 91 will be driven in accordance with engine throughout signal information and that the valve 101 will be controlled in accordance with equivalence ratio signal information.

As pointed out hereinabove, the present invention is in no way limited to the specific apparatus illustrated in FIGS. 1, 4, 5, 6, 7 and 8 of the drawings. As described above, the present invention, in some of its forms, controls the rate at which additional air is supplied to the gas applied to the afterburning system in accordance with the rate at which combustibles, in the gas, flow to the afterburning system. Thus the air addition arrangements discussed provide additional oxygen-containing air to the afterburning system at a rate which is determined by the magnitude of at least two engine operation determinants. When the engine speed (engine operation determinant) increases, additional air from the air supply means tends to increase, and when the intake manifold vacuum (engine operation determinant) is greater than 10″ Hg the dump system bleeds a portion of the air pumped to the atmosphere. Specifically when the engine speed is approximately 2400 r.p.m. at the same time the intake manifold vacuum is less than 10″ Hg the rate of air flow through the engine system is about 10 p.p.m., full throttle regime (FIG. 2b) and the air supply means will provide oxygen-containing air to the air addition type afterburning system at a rate of 2 p.p.m. (FIG. 2a). From the above definition of equivalence ratio, it is apparent that this operating condition of the engine requires a 20% addition (2 p.p.m.) of air to provide an air-exhaust gas mixture equivalence ratio of 1 in the afterburner. Thus it is apparent that detection of these engine operation determinants results in a flow of additional air which will facilitate the oxidation of the combustibles flowing through the engine system.

As is mentioned above and will be explained in detail below, the rate of flow of combustibles in the exhaust gas is detectable by sensing other engine operation determinants, such as the rate of air flow and the rate of fuel flow through the engine system. By multiplying a signal indicative of the rate of fuel flow by a factor which will provide a magnitude of signal information equal to the correct rate of total air flow (air flow through the engine and additional air) necessary to oxidize the rate of fuel flow detected, it is possible to obtain a desired rate of additional air flow by simply subtracting the rate of engine air flow signal from the rate of fuel flow signal information. Since the carburetor system of a conventional automobile engine system supplies an air-fuel mixture under conditions which prevent a complete oxidation of combustible constituents to occur in the engine 10, the comparison of the signal informations rate of fuel flow and rate of air flow will provide a rate of air addition signal information which error type signal information may be used to control the pumping rate of an air supply system providing additional oxygen-containing air to the afterburner 12.

As shown in FIG. 9, an engine system includes the engine 10, a fuel supply line 110 connected to a fuel source or tank 111, a carburetor 112 which receives air from an intake air filter 113, an intake manifold 114, between the carburetor 112 and the engine 10, and an exhaust manifold 115 between the engine 10 and the exhaust gas pipe 11. The throttle valve (within the carburetor) is opened or closed in response to the operation of a conventional throttle control pedal 116 coupled thereto by a throttle linkage system 117.

In order to obtain engine air flow rate signal information in accordance with throttle position, a three-dimensional contour cam 120 is drivably connected to the engine 10 by an induction or speedometer type clutch 122 (similar to an inductive type clutch mechanism of a conventional speedometer). Thus the speed of the engine 10 will control the angular position of the three-dimensional contour cam 120. A biasing means such as a torsional spring 123 causes a cam follower 124 to engage the uppermost outer surface of the cam 120 at a point displaced from the axis of the cam 120 a distance dependent upon the contour and the rotation of the cam 120 in response to speed signal information and with the longitudinal location of the point of contact being dependent on throttle setting in response to the position of the throttle linkage 117. As the throttle valve is moved toward the full open throttle position, the cam follower 124 will be caused to move toward the larger end (toward the left as shown in FIG. 9) of the cam 120 by a linkage 126 rotatably coupled to the throttle linkage 117. By proper contouring of the cam 120, this arrangement will provide signal information indicative of the rate of air flow through the carburetor 112 of the engine system.

In a typical carburetion system, throttle position and engine speed will determine the rate of air flow through an engine as shown in the curves of FIG. 10, wherein the scale of the abscissae is in engine speed (r.p.m.) and the scale of the ordinates is the air flow rate through the engine system in s.c.f.m. and p.p.m., and wherein the longitudinal position of the throttle linkage 117 is a parameter. A selected cross-section of the contour of the cam 120 represents one of the family of curves shown in FIG. 10. For instance, during minimum throttle position, where the throttle linkage 117 is positioned to cause the linkage 126 to move to the extreme right (FIG. 9), with one engine system tested, the air flow rate through the intake manifold 114 is a constant of 10 s.c.f.m. or .75 p.p.m. at all engine speeds. This minimum throttle (or deceleration) operation causes the cam follower 124 to be longitudinally positioned where the cam 120 has a small and substantially cylindrical outer surface at a minimum throttle position end thereof (toward the right as shown in FIG. 9). On the other hand, during full throttle operation the air flow rate through the engine system varies between about 40 s.c.f.m. or 3 p.p.m. at 600 r.p.m. and 220 s.c.f.m. or 16.5 p.p.m. at 4,000 r.p.m. whereby the radial offset at the full throttle position of the cam follower 124 of cam contour surface may be increased accordingly. At intermediate throttle settings, causing the linkage to be moved .65, .5, etc. of its total stroke, the rate of air flow through the engine will be intermediate to that of the full throttle and minimum throttle and the contour of the cam 120 between the minimum throttle and full throttle settings is machined to provide a displacement of the cam follower 124 from the axis of the cam 120 which is a predictable function of the rate of air flow through the carburetion system at any given speed and throttle setting. Thus each point on the surface of the cam 120 corresponds to a point on one of the complete family of curves represented by the several curves of FIG. 10, with the radial displacement thereof being a function of the rate of air flow through the engine system at a particular speed and throttle setting.

Utilizing the above-described three-dimensional contour cam 120, one simple means of detecting the air flow rate through the engine is by connecting a movable tap or contact of a potentiometer 127 to the cam follower 124 with a spline type driving connection so that the voltage at the contact is a predictable function of the radial displacement of the cam follower 124. The cam 120 is contoured to control the displacement of the cam follower 124 and thus the rotation of the linkage 126. Thus the voltage at the contact of the potentiometer 127 continuously provides signal information in accordance with the rate of air flow through the engine system. In FIG. 9 a spline shaft 129 is telescopically secured to the linkage 126 whereby rotation thereof will rotate the contact of the potentiometer 127, while longitudinal movement of the linkage 126 will not affect the voltage signal. With the potentiometer 127 having a linear resistance characteristic and the rotation of the linkage 126 being proportional to the rate of engine air flow, a voltage signal variation directly proportional to the change of rate of air flow is obtained. It is preferred that the gears 131 and 132 coupling the potentiometer 127 to the spline shaft 129 have a ratio which will cause a desirable displacement of the contact of the potentiometer 127 over the range of possible engine operating conditions. Thus FIG. 9 illustrates a simple and reliable means for detecting air flow rate and providing a signal information indicative thereof. The arrangement shown is a simple mechanical-type computer for combining two engine operation determinants to obtain a measure of the rate of air flow through the engine system.

Another relatively simple mechanical computer is indicated in FIG. 9 wherein the cam 120 is not rotated by the speedometer type clutch 122 but, instead, is rotated in accordance with the manifold vacuum sensed by the sensing arrangement 81 shown in dotted lines (FIG. 9) of the type discussed above in connection with FIG. 7. With this arrangement, the flexible diaphragm 60, within the sensing arrangement 81, is connected to the cam 120, whereby variations of the manifold vacuum will cause a desired rotation of the cam 120. However, the engine air flow rate functional relation between the manifold vacuum and throttle linkage position is such that the contour of the cam 120 will be modified somewhat from that discussed in connection with FIGURE 10. When the cam 120 is operable in accordance with manifold vacuum, the cam contour must be machined in accordance with the family of curves shown in FIG. 11 wherein the scale of the abscissae is the manifold vacuum in inches Hg and the scale of the ordinates is the air flow rate through the engine system in s.c.f.m. and p.p.m., and wherein the longitudinal position of the throttle linkage 117 is a parameter. The minimum and maximum speeds of a particular engine are depicted by the dotted lines $S_1$ and $S_2$. Except for the change of the cam contour, the two arrangements of FIGURE 9 for measuring the engine air flow rate are comparable.

Since the throttle setting, engine speed, manifold vacuum and air flow rate through the engine are all interdependent, the measurement of any two of the engine operation determinants will provide signal information indicative of the engine air flow rate.

Another simple means for obtaining air flow rate signal information is a rate of fluid flow meter (not shown) connected in series with the carburetor 112 or a meter (not shown) connected to detect pressure drop across the air filter 113. However, with most of the conventional rate of fluid flow meters or pressure differential meters the magnitude of the output signal voltage would be small whereby an additional power amplifying device would be required.

Once the engine air flow rate is determined an air addition signal may be derived by detecting the desired total rate of air flow necessary. In order to determine precisely the total rate of air flow necessary to provide a desirable air-exhaust gas mixture equivalence ratio in the afterburner 12, a rate of fuel flow meter 134 is connected between the fuel tank 111 of the engine system and the carburetor 112 of the engine system to provide a signal indicative of the rate at which fuel is supplied to the engine system. Details of the rate of fluid flow meter 134 are known and need not be discussed herein. One such meter presently on the market which provides a linear voltage signal compared to flow rate utilizes a permanent magnet generating system driven by a turbine placed within the fluid stream. Since the relationship between the air flow rate and the voltage at the contact of the potentiometer 127 may be varied by simply selecting a potentiometer having a characteristic matching a non-linear signal from the rate of fluid flow meter 134, it is entirely feasible to use other types of rate of fluid flow meters. However, in the preferred form, the voltage magnitudes are linearly proportional to the respective rates detected.

As mentioned above, the rate of fuel flow will determine the total rate of air flow (engine air flow plus additional air) necessary to obtain a leaner than stoichiometric mixture whereby all of the combustible constituents passing through the engine 10 and the afterburner 12 may be oxidized. By connecting one of the known rate of fluid flow meters through a power amplifier 135 energized from the battery or generator of the engine system, a signal information indicative of the desired total rate of air flow is obtainable and is of a voltage magnitude comparable with that of the rate of air flow through the engine system signal. By subtracting the rate of air flow signal information from the rate of fuel flow signal information, one immediately obtains signal information indicative of the desired rate of air addition.

Thus, in the above-described engine system, having a 280 cubic inch displacement engine and a twelve volt electrical system, the rate of fuel flow varies, by way of example, from a minimum of .06 to a maximum of 1.23 p.p.m. By means detecting the rate of fuel flow, including the meter 134 and the amplifier 135, this variation is convertible to a voltage signal having a magnitude of variation of .64 to 12 volts. In such an engine system, when using a fuel, such as gasoline, wherein the equivalence ratio of 1 requires 14.7 pounds of air per pound of fuel, a desirable overall equivalence ratio of .95 in the air-exhaust gas mixture supplied to the afterburner 12, requires 15.6 pounds of air per pound of fuel supplied to the engine. A comparable voltage signal of the air flow rate of .75 to 16.5 p.p.m. through the engine system results in a rate of air flow signal of .47 to 10.3 volts. Thus during idle an error signal is .17 volt and during maximum speed full throttle operation the error signal is 1.7 volts whereby a positive displacement pump 142 should be driven to provide air at rates of 3 s.c.f.m. or .21 p.p.m. and 35 s.c.f.m. or 2.6 p.p.m. respectively, to allow combustion of the exhaust gas combustibles at a desirable reaction rate in the afterburner 12.

According to the present invention, there is provided a comparison device 140 which will receive as inputs, both the rate of fuel flow signal information (.64–12 volts) and the rate of air flow signal information (.47–10.3 volts) to provide air addition signal information. This air addition signal information may be used to control the supply rate of an air addition supply system comprising the positive displacement pump 142 and an air conduit 143 connecting the output of the pump 142 to a mixing means indicated at 144 in the exhaust pipe 11 prior to the application of the exhaust gas to the afterburner 12.

The particular comparison device 140 illustrated in FIG. 9 includes a simplified circuit diagram of a direct current motor having an armature 150, a main field 152 and a control field winding 154. Several variable speed direct current motor systems are known and, although the system may require a power amplifier 155 to cause a maximum variation of speed with a .17 to 1.7 volt variation of control signal information, the details of the theory of operation of such a system need not be explained herein. A desirable operation of the comparison device 140 is obtained when the speed of the positive displacement pump 142, in response to the excess combustible signal, is directly proportional to the difference voltage supplied to the amplifier 155. The air addition signal information is impressed upon the pump 142 by a driving connection 156 between the armature 150 of the direct current motor and the pump 142. In other words, the pump 142 is driven at a speed which will cause the supplying of air at a rate which is a function of the difference between the engine air flow rate signal and the rate of fuel flow signal.

Usually, in order to provide desirable flame speed or reaction rate in the afterburner 12, a slight excess, such as 5% of additional oxygen-containing air, should be provided by the pump 142. It should be noted that provision of a slight excess of additional oxygen-containing air will increase the reaction rate within an air addition afterburning system. For instance, during operation in the cruise regime a relatively small concentration of combustibles flows through the afterburner. The combinable gas molecules (oxygen and combustibles) are flowing with a substantially larger amount of inert matter whereby random motion of the gas molecules will result in a reaction only when collision between combinable molecules occurs. Thus the reaction rate is a function of the concentration of oxidizable constituents times the concentration of oxygen. A slight increase of the free oxygen concentration will result in a substantial increase of the rate of reaction.

On the other hand, during operation in the full throttle regime, a relatively larger concentration of combustibles flow through the afterburner whereby a stoichiometric mixture will react at a rapid rate until the reaction nears completion. As the reaction nears completion, the rate of reaction will be similar to that during the cruise regime except for the fact that the temperature of the mixture is likely to be higher whereby the speed of the molecules and the number of collisions therebetween per unit time is increased. As a result cleanup of the last traces of combustible constituents at reasonable rates of reaction will be facilitated by the provision of an excess of free oxygen. During full throttle regime, however, this excess may be slightly less than during the cruise regime because of the tendency of the reaction temperature to be higher. Therefore, without impairing the operation of the above-described air addition systems, the provision of air at maximum air addition rates may be slightly less than 5% above what would result in a stoichiometric mixture. Referring specifically to FIG. 9, a slight droop in the speed characteristic of the armature 150 will not be detrimental so long as the overall equivalence ratio remains in the vicinity of 1.

Another feature of the overall air addition type afterburning system is that a practical size of a combustion chamber within the afterburner may not provide a sufficient residence time for maximum gas flow rates to allow the reaction to go to completion. However, this practical restriction will not greatly influence the exhaust of smog producing elements from an engine system because of the fact that a very small percentage of the overall engine operation is within this region. Moreover, the smog producing compounds, at the reaction temperatures experienced in the afterburner during the full throttle regime, will have a greater affinity to oxygen than simpler compounds such as carbon monoxide, whereby the exhausted oxidizable compounds will consist primarily of carbon monoxide which of itself is not believed to contribute to the smog problem.

While there have been shown and described several embodiments of the present invention, other modifications may occur to those skilled in the art. For instance, it is recognized that certain other carburetion systems may provide excess fuel because of the operation of the power jets at intake manifold vacuums somewhat different from those specifically referred to and that in some of the simpler carburetion systems, a single main jet orifice is variable with throttle position to provide excess fuel for maximum acceleration. However, the signal information obtainable from the engine system when combined with the characteristics of the air supply system may be used to provide a desired variation of the control of the additional air supplied to the afterburner. Moreover, certain afterburners may present a substantially different back pressure characteristic in response to the throughput variations whereby the air supply system should be modified accordingly. Therefore it is intended by the appended claims to cover all such modifications as fall within the true spirit and scope of this invention.

The embodiments of the invention in which an exclusive property or privilege is claimed are defined as follows:

1. A method of providing additional air for an afterburner to complete the combustion of exhaust gas from a throttle-controlled internal combustion engine comprising the steps of: first, supplying air in accordance with the total flow of air-fuel mixture passing through the engine in a given unit of time; second, sensing the actual air-fuel ratio divided into the stoichiometrically correct air-fuel ratio of the total flow passing through the engine in a given unit of time; and controlling the air supply to the afterburner in accordance with the first and second steps so as to maintain in the air-exhaust mixture within the afterburner an actual afterburner fuel-ratio which, when divided into the stoichiometrically correct fuel-ratio, is equal to slightly less than one.

2. An exhaust gas air addition type afterburning system in which additional oxygen-containing air is controllably mixed with the exhaust gas received thereby from an engine to increase the completeness of combustion of any combustible material present in the exhaust gas, said engine being operable in conjunction with a carburetor system having a choke means for increasing the actual air-fuel ratio divided into the stoichiometrically correct air-fuel ratio of the air-fuel intake mixture of the engine to facilitate starting of the engine when cold, the combination of: an afterburner system; means coupled and responsive to operating characteristics of said engine for supplying air to the afterburner system at controllable rates, said controllable rates including a minimum rate and a maximum rate at any given operating condition; and means connected to respond to the condition of the choke means for controlling the air supplying means to maintain the operation thereof at said maximum rate when the choke is operative to increase the actual air-fuel ratio divided into the stoichiometrically correct air-fuel ratio of the said intake mixture.

3. An air-addition type afterburning system in which combustible constituents conditionally present in a gas applied to the afterburning system for treatment may be oxidized, the completeness with which said constituents are capable of being oxidized within the afterburning system being a function of the rate at which oxygen-containing air is additively mixed with the gas prior to its application to the afterburning system, the desired rate at which air is additively mixed with the gas, at any given time, being in turn a function of the rate at which gas is applied to the afterburning system, the combination of: means for applying said gas to said afterburning system; first means for supplying oxygen-containing air at a rate at least equal to the maximum rate at which oxygen-containing air is added to the afterburning system for the maximum rate at which gas is applied to the afterburning system; second means operatively coupled to said first means for additively mixing the air supplied by said first means with a gas to be treated by the afterburning system, and third means operatively coupled to both said first and second means and responsive to the rate at which gas is applied to the afterburning system, for controllably dumping, at varying rates, the oxygen-containing air supplied by said first means, so that the rate at which oxygen-containing air is effectively mixed with the gas, prior to the application of the gas to the afterburning system, is a substantially continuous function of the rate at which gas is applied to the afterburning system.

4. An air-addition type afterburning system defined in claim 3 wherein the afterburning system is designated for use in conjunction with an internal combustion engine comprising a source of gas to be treated and having both intake and exhaust manifolds in which said gas, containing combustible constituents, resides under different pressures, the values of said different pressures varying in accordance with the rate at which gas passes through the manifolds, and wherein means are additionally provided in said second means for coupling said second means to the exhaust manifold of said internal combustion engine to receive exhaust gas from the engine and to provide the mixing of air supplied by said first means with the exhaust gas of the engine, and wherein said third means for controllably dumping varying amounts of the oxygen-containing air, include means responsive to the varying pressure of gas in the exhaust manifold of the engine to control the rate at which said oxygen-containing air is dumped.

5. In combination with an air addition means operable to provide additional oxygen-containing air as a function of the speed of an internal combustion engine, operable in a cruise regime wherein the rate of flow of combustible constituents is less than in another operational regime of the engine, and an afterburner connected to receive exhaust gas from the engine and at least a portion of the additional air from the air addition means with the afterburner having a preedterminable pressure drop thereacross as a function of the total flow passing through the afterburner in a given unit of time, a dump resistance system comprising: dump resistance means for restricting the flow of air therethrough; control means connected to detect the operation of the engine in at least the cruise regime for connecting said dump resistance means between the output of the air addition means and the atmosphere and thus in parallel with the afterburner; said dump resistance means having a back pressure that is a function of the dump flow rate therethrough; said dump resistance back pressure flow rate being in accordance with the back pressure of the afterburner which is functionally related to the total flow passing through the afterburner in a given unit of time for controlling the portion of air dumped as a function of the back pressure of the afterburner said dump resistance thus providing the afterburner with a predetermined ratio of additional air which is compared to exhaust gas flow from the engine during substantially different cruise speeds of the internal combustion engine.

6. An air-addition type afterburning system in which combustible constituents present in a gas applied to the afterburning system for treatment may be oxidized, the completeness with which said constituents are capable of being oxidized within the afterburning system being a function of the rate at which oxygen-containing air is additively mixed with the gas prior to its application to the afterburning system, the desired rate at which air is additively mixed with the gas, at any given time, being in turn a function of both the rate at which gas is applied to the afterburning system and the weight of excess combustibles present in a given weight of gas, the weight of said excess combustibles being in turn determined by the actual weight of combustible constituents in a unit weight of gas in excess of the weight of combustible constituents capable of complete oxidation by the free oxygen present in said unit weight of gas prior to the addition of oxygen-containing air, the combination of: means for applying said gas to said afterburning system; first means for supplying oxygen-containing air at a rate at least equal to the maximum rate at which oxygen-containing air is needed by the afterburning system over ranges of both the excess combustibles present in a given weight of exhaust gas and the rate at which gas is applied to the afterburning system; second means operatively coupled to said first means for additively mixing the air supplied by said first means with gas to be treated by the afterburning system; and third means operatively coupled to both said first and second means and responsive to both the excess combustibles present in a give weight of gas and the rate at which gas is applied to the afterburning system, for controllably dumping at varying rates the oxygen-containing air supplied by said first means so that the rate at which oxygen-containing air is effectively mixed with gas prior to the application of the gas to the afterburning system is a substantially continuous function of both the weight of excess combustibles per unit weight of gas and the rate at which the gas is applied to the afterburning system.

7. An air addition system connected to supply air to an afterburner for completing the combustion of the exhaust gas of an intake throttle-controlled internal combustion engine wherein the afterburner is subject to flameout considerations in the absence of additional air or in the presence of excessive additional air, comprising: a positive displacement pump driveably connected to the engine for providing air in proportion to engine speed and in proportion to the total flow passing through the engine in a given unit of time during full throttle operation; a dump regulator connected to sense and compare to atmospheric pressure the vacuum in an intake manifold of the engine; a dump control valve; said dump regulator being connected to cause said dump control valve to open when there is a large intake vacuum differential with respect to atmospheric pressure, to close when there is a small intake vacuum differential with respect to atmospheric pressure, and to open partially during at least a portion of the change between said large and small intake differentials; a conduit connecting said pump to the afterburner and defining an exhaust port therein communicating with one side of said dump control valve; and a dump resistance connected between the other side of said valve and the atmosphere, said resistance having design characteristic to restrict the dumping of air from the pump in accordance with the requirements as determined by back pressure induced by the afterburner.

8. A combustion system including a throttle-controlled internal combustion engine capable of exhausting noxious material during at least a portion of the operating conditions with the operating conditions including substantial variations in volume of exhaust gas and combustible content in the flow within an exhaust gas pipe connected to an afterburner, and means of controllably supplying additional air to the afterburner comprising: driveable pump means of suitable capacity connected to supply adequate air to the afterburner during all operating conditions of the engine; means operable in accordance with the speed of the engine for driving said pump means at a rate providing air addition as a function of speed; conduit means for conducting the air pumped, including a section connected between the pump means and the afterburner to conduct to the afterburner at least a portion of the air pumped; sensing means connected to said engine to derive signal information indicating the actual air-fuel ratio divided into the stoichiometrically correct air-fuel ratio; and regulating means operably connected to the sensing means and operatively connected to the conduit means to control the air flow delivered by the pump means to the afterburner in accordance with the actual air-fuel ratio divided into the stoichiometrically correct air-fuel ratio.

9. A throttle controlled internal combustion engine capable of large variations in the total flow entering and passing through the engine in a given unit of time and having an intake for receiving a fuel-air mixture and an exhaust system including an afterburner connected to the engine to receive gas flow from the engine, and an afterburner air addition means comprising: pump means connected to the afterburner; said pump means being capable of supplying sufficient air to the afterburner for stoichiometric burning under all engine total flow conditions during a given unit of time; driving means connected to said pump means for driving said pump means at a speed proportional to the engine speed; regulating means connected to the engine intake to be controlled in response to the total flow passing through the engine in a given unit of time and fuel to air ratio mixtures; said regulating means being connected to said pump means to dump a portion of the air from said pump means in response to the total flow passing through the engine in a given unit of time; and dump resistance means connected to said regulating means for providing a resistance to the flow of air dumped by said regulating means which is proportional to the internal resistance of the afterburner.

10. An internal combustion engine capable of large variations in the total flow entering and passing through the engine in a given unit of time and having an intake for receiving a fuel-air mixture and an exhaust system including an afterburner connected to the engine to receive gas flow from the engine, and an afterburner air addition means comprising: pump means connected to the afterburner; said pump means being capable of supplying sufficient air to the afterburner for stoichiometric burning under all engine total flow conditions during a given unit of time; driving means connected to said pump means for driving said pump means at a speed proportional to the engine speed; regulating means connected to the engine intake to control the supply of air to the afterburner; air flow control means connected to said pump means and operable in cooperation with said regulating means for providing the afterburner air supply with a resistance characteristic substantially proportional to the afterburner resistance characteristic during all flow conditions upon operation of said regulating means.

11. A throttle controlled internal combustion engine capable of large variations in the total flow entering and passing through the engine in a given unit of time and having an intake for receiving a fuel-air mixture and an exhaust system including an afterburner connected to the engine to receive gas flow from the engine, and an afterburner air addition means comprising: pump means connected to the afterburner; said pump means being capable of supplying sufficient air to the afterburner for stoichiometric burning under all engine total flow conditions during a given unit of time; driving means connected to said pump means for driving said pump means at a speed proportional to the engine speed; regulating means connected to the engine intake to control the supply of air to the afterburner; air flow control means connected to said pump means and operable in cooperation with said regulating means for providing the afterburner air supply with a resistance characteristic substantially proportional to the afterburner resistance characteristic during all flow conditions and upon operation of said regulating means; and said regulating means containing a throttling valve arrangement substantially unaffected by pressure variations in the engine exhaust gas pipe.

12. A throttle controlled internal combustion engine capable of large variation in the total flow entering and passing through the engine in a given unit of time and having an intake for receiving a fuel-air mixture and an exhaust system including an afterburner connected to the engine to receive gas flow from the engine, and an afterburner air addition means comprising: pump means connected to the afterburner; said pump means being capable of supplying sufficient air to the afterburner for stoichiometric burning under all engine total flow conditions during a given unit of time; driving means connected to said pump means for driving said pump means at a speed proportional to the engine speed; regulating means connected to the engine intake to be controlled in response to the total flow passing through the engine in a given unit of time and fuel to air ratio mixtures; said regulating means being connected to said pump means to dump a portion of the air from said pump means in response to the total flow passing through the engine in a given unit of time; dump resistance means connected to said regulating means for providing a resistance to the flow of air dumped by said regulating means which is proportional to the internal resistance of the afterburner; and said dump resistance being provided with a plurality of tubular passages of a size and number which will provide laminar flow therein during low dumping rates and will provide turbulent flow therein during high dumping rates.

13. A dump controlled air addition system for an afterburner arranged to receive exhaust gases from the exhaust system of a throttle controlled internal combustion engine capable of large variations in the total flow passing through the engine in a given unit of time, a dump controlling resistance device in said air addition system connected in parallel to said afterburner, comprising: a container defining an elongated space therein; an aperture at one end for admitting air from the air addition system; a second aperture at the other end for exhausting air therefrom; said container-formed elongated space containing elements defining a plurality of parallel air flow passages providing air flow between the first and second apertures; said parallel air flow passages being of such proportions that during lower flow rates the air flow therethrough is laminar with resistance change of fluid flow therethrough being proportional to changes in flow rates; said parallel passages being of such proportions that at higher flow rate the air flow therethrough is turbulent with the change from laminar to turbulent flow occurring at an intermediate flow rate; said changes in flow rates defining a flow resistance proportional to air exhaust flow through the afterburner.

14. A throttle and automatic choke controlled internal combustion engine capable of large variations in the total flow passing through the engine in a given unit of time and engine intake mixtures and having a exhaust system including an afterburner connected to the engine to receive gas flow from the engine, and an afterburner air addition means comprising: pump means connected to the afterburner; said pump means being capable of supplying sufficient air to the afterburner for stoichiometric burning under all engine total flow conditions during a given unit of time; driving means connected to said pump means for driving said pump means at a speed proportional to the engine speed; regulating means connected to the engine intake to control the supply of air to the afterburner; and valve means connected to respond to the automatic choke to disable said regulating means during operation of the automatic choke for the purpose of providing full pump air supply to said afterburner.

15. In an air dump regulated air addition system for an afterburner arranged to receive substantially all exhaust gases from the exhaust system of an intake manifold throttle controlled internal combustion engine capable of pressure fluctuations and large variations in the total flow passing through the engine in a given unit of time, the combination with said system of an air dump regulating valve comprising; a body member forming first, second, third and fourth chambers; flexible diaphragm means separating said first and second chambers; first aperture means for venting said first chamber to the atmosphere; conduit means connecting said second chamber to the intake manifold of the internal combustion engine; air intake and air exhaust apertures in said third and fourth chambers, respectively; valve closure means between said third and fourth chambers having fixed and movable members; linkage means connecting said diaphragm to said valve movable member for displacement in response to diaphragm displacement; and balancing means connected to said linkage for opposing movable valve member displacement in response to said pressure fluctuations in said air intake and air exhaust apertures.

16. In an air dump regulated air addition system for an afterburner arranged to receive substantially all exhaust gases from the exhaust system of an intake manifold throttle controlled internal combustion engine capable of pressure fluctuations and large variations in the total flow passing through the engine in a given unit of time, the combination with said system of an air dump regulating valve comprising: a body member forming first, second, third and fourth chambers; flexible diaphragm means separating said first and second chambers; first aperture means for venting said first chamber to the atmosphere; conduit means connecting said second chamber to the intake manifold of the internal combustion engine; air intake and air exhaust apertures in said third and fourth chambers, respectively; valve closure means between said third and fourth chambers having fixed and movable members; linkage means connecting said diaphragm to said valve movable member for displacement in response to diaphragm displacement; balancing means connected to said linkage for opposing movable valve member displacement in response to said pressure fluctuations in said air intake and air exhaust apertures; and adjustable biasing means in said fourth chamber connected to said valve movable member for biasing the movable member to a desired threshold level.

References Cited in the file of this patent

UNITED STATES PATENTS

| | | |
|---|---|---|
| 1,260,246 | Point | Mar. 19, 1918 |
| 1,789,812 | Frazer | Jan. 20, 1931 |
| 1,999,697 | Kleckner et al. | Apr. 30, 1935 |
| 2,070,411 | Powers | Feb. 9, 1937 |
| 2,174,626 | Fogas | Oct. 3, 1939 |
| 2,217,241 | Tendler | Oct. 8, 1940 |
| 2,263,318 | Tifft | Nov. 18, 1941 |
| 2,559,623 | Holmes | July 10, 1951 |
| 2,610,466 | Ballantyne et al. | Sept. 16, 1952 |
| 2,771,736 | McKinley | Nov. 27, 1956 |
| 2,848,186 | Bayer | Aug. 19, 1958 |
| 2,880,079 | Cornelius | Mar. 31, 1959 |
| 2,953,898 | Cornelius | Sept. 27, 1960 |